(12) United States Patent
Fernandez et al.

(10) Patent No.: US 9,683,614 B2
(45) Date of Patent: Jun. 20, 2017

(54) TRANSMISSION GEAR SYNCHRONIZER BLOCKER RING FORMED OF A THERMOPLASTIC MATERIAL

(71) Applicant: Eaton Corporation, Cleveland, OH (US)

(72) Inventors: Josevaldo Roberto Fernandez, Salto (BR); Thiago Fontoura de Andrade, Valinhos (BR); Carlos Henrique Coronado Sena, Campinas (BR)

(73) Assignee: Eaton Corporation, Cleveland, OH (US)

( * ) Notice: Subject to any disclaimer, the term of this patent is extended or adjusted under 35 U.S.C. 154(b) by 216 days.

(21) Appl. No.: 14/608,994

(22) Filed: Jan. 29, 2015

(65) Prior Publication Data

US 2015/0211585 A1    Jul. 30, 2015

Related U.S. Application Data

(60) Provisional application No. 61/932,966, filed on Jan. 29, 2014.

(51) Int. Cl.
| | |
|---|---|
| *F16H 3/08* | (2006.01) |
| *F16D 13/22* | (2006.01) |
| *F16D 23/00* | (2006.01) |
| *F16D 23/06* | (2006.01) |
| *F16D 23/02* | (2006.01) |

(52) U.S. Cl.
CPC .......... *F16D 23/06* (2013.01); *F16D 23/025* (2013.01); *F16D 2023/0656* (2013.01); *F16D 2300/10* (2013.01); *Y10T 74/19284* (2015.01)

(58) Field of Classification Search
CPC . F16D 23/06; F16D 23/025; F16D 2023/0631
USPC ..................................... 74/335, 339
See application file for complete search history.

(56) References Cited

U.S. PATENT DOCUMENTS

| | | | | |
|---|---|---|---|---|
| 4,413,715 A | * | 11/1983 | Michael ................. | F16D 23/06 192/53.31 |
| 4,566,568 A | * | 1/1986 | Yant ....................... | F16D 23/06 192/53.341 |
| 4,677,868 A | * | 7/1987 | Filkins .................... | F16D 23/06 464/24 |
| 4,823,631 A | * | 4/1989 | Kishimoto .............. | F16D 23/06 192/53.32 |
| 5,135,087 A | | 8/1992 | Frost | |
| 5,269,400 A | * | 12/1993 | Fogelberg ............... | F16D 23/06 192/53.34 |
| 2014/0090499 A1 | | 4/2014 | Fernandez | |

* cited by examiner

*Primary Examiner* — Ha D Ho
(74) *Attorney, Agent, or Firm* — Remarck Law Group PLC

(57) ABSTRACT

A transmission gear synchronizer may include a sliding sleeve, a hub configured to be received within the sliding sleeve, and a blocker ring disposed adjacent the hub. The blocker ring may have a plurality of molded clutch teeth and a plurality of molded grooves extending axially along an inner surface of the blocker ring.

16 Claims, 6 Drawing Sheets

TRANSMISSION GEAR SYNCHRONIZER BLOCKER RING FORMED OF A THERMOPLASTIC MATERIAL

CROSS-REFERENCE TO RELATED APPLICATIONS

This application claims the benefit of U.S. Provisional Application No. 61/932,966, filed Jan. 29, 2014; the disclosure of which is hereby incorporated in its entirety by reference herein.

TECHNICAL FIELD

The present disclosure relates to a transmission gear synchronizer blocker ring formed of a thermoplastic material.

BACKGROUND

A dual cone synchronizer with servo action is disclosed in U.S. Pat. No. 5,135,087.

SUMMARY

In at least one an embodiment, a transmission is provided. The transmission may include a first gear set, a second gear set, and a transmission gear synchronizer. The first gear set may be supported by a first shaft. The second gear set may be supported by a second shaft. The second gear set may be in meshed engagement with the first gear set. The first gear set and the second gear set may be rotatably disposed within a transmission housing. The transmission gear synchronizer may be supported by the first shaft and disposed adjacent to a gear of the first gear set. The transmission gear synchronizer may include a sliding sleeve, a hub, and a blocker ring. The sliding sleeve may have an inner surface defining a sleeve spline. The hub may be received within the sliding sleeve. The hub may have a plurality of gear teeth extending radially outward from a root diameter of the hub. The plurality of gear teeth may be configured to engage the sleeve spline. The hub may have a notch disposed proximate the root diameter of the hub and may be spaced apart from the plurality of gear teeth. The blocker ring may comprise a thermoplastic material. The blocker ring may have a plurality of mold clutch teeth extending radially outward from a root diameter of the blocker ring. The blocker ring may have an inner surface defining a molded spline. The plurality of molded clutch teeth may be configured to engage the sleeve spline in response to the sliding sleeve engaging the blocker ring during a transmission shift event.

In at least one embodiment, a transmission gear synchronizer is provided. The transmission gear synchronizer may include a sliding sleeve, a hub, and a blocker ring. The sliding sleeve may have an inner surface defining a plurality of sleeve teeth extending radially inward from the inner surface of the sliding sleeve towards a transmission shaft. Each sleeve tooth of the plurality of sleeve teeth may have a tip. The tip may be defined by a first surface disposed at a first angle relative to a longitudinal axis of a transmission shaft and a second surface disposed at a second angle relative to the longitudinal axis of the transmission shaft. The hub may have a plurality of hub gear teeth extending radially outward from a root diameter of the hub. The hub may be configured to be received within the sliding sleeve. The blocker ring may be formed from a thermoplastic material and may be disposed adjacent the hub. The blocker ring may have a plurality of molded clutch teeth that may extend radially outward from the root diameter of the blocker ring. Each molded clutch tooth of the plurality of molded clutch teeth may have an end surface. The end surface may be defined by a third surface disposed at a third angle relative to the longitudinal axis of the transmission shaft and a fourth surface disposed of a fourth angle relative to the longitudinal axis of the transmission shaft. The second surface may be configured to engage the third surface during a transmission upshift event. The first surface may be configured to engage the fourth surface of an adjacent molded clutch to of the blocker ring during the transmission downshift event. An inner surface of the blocker ring may define a plurality of molded grooves extending axially along the inner surface of the blocker ring. Each molded groove of the plurality of molded grooves may be disposed substantially parallel to a longitudinal axis of the blocker ring.

In at least one embodiment, a transmission gear synchronizer blocker ring is provided. The transmission gear synchronizer blocker ring may include a first end region, a second end region, and a generally cylindrical body. The first end region may be configured to be disposed proximate an engagement ring. The first end region may have a plurality of molded clutch teeth disposed continuously about a circumference of the first end region. The second end region may be configured to be disposed proximate a sleeve assembly. The generally cylindrical body may extend between the first end region and the second end region. The generally cylindrical body may have an outer surface and an inner surface. The outer surface may have a molded engagement pad extending radially outward from the outer surface. The molded engagement pad may be configured to mate with a notch of the sleeve assembly. The inner surface may have a plurality of molded grooves. Each molded groove of the plurality of molded grooves may extend in an axial direction along the inner surface. The plurality of molded grooves may be configured to engage a cone of an engagement ring during a transmission shift event responsive to a difference in rotational speed between a gear and the sleeve assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
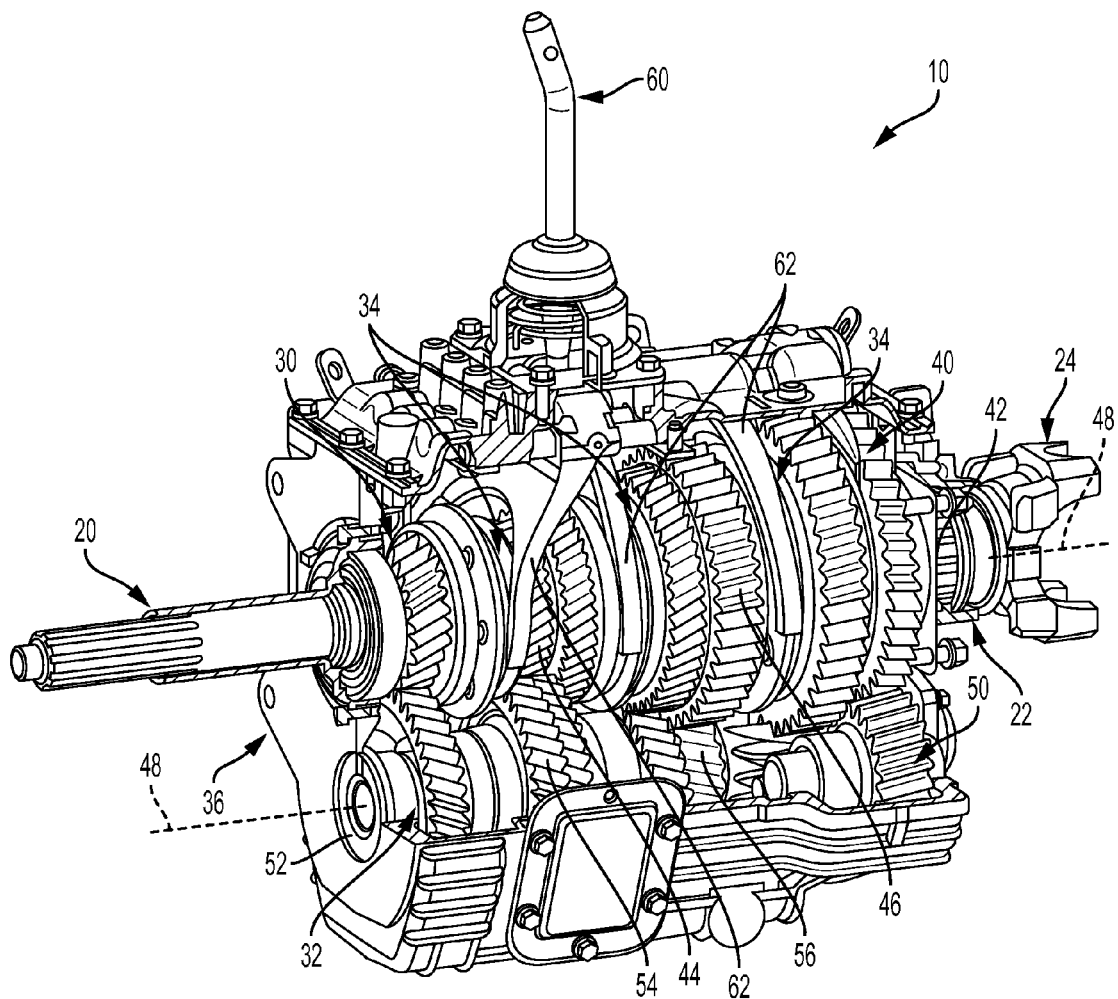
FIG. 1 is a perspective view of a compound manual transmission with the case partially removed.

Referring to FIG. 1, a transmission 10 may be provided with a vehicle such as an automobile, a truck or the like. The transmission 10 may be configured as a mechanical manual transmission, a dual clutch transmission, an automated transmission, a sequential transmission, or a mechanical device that may require differential speed equalization. The transmission 10 transmits power from a power source, such as an internal combustion engine to a drive axle.

The transmission 10 may include an input shaft 20 configured to engage the power source (not shown) via a clutch, a fluid coupling, or a flywheel. The transmission 10 may include an output shaft 22 configured to engage a differential or drive member (not shown). The combination of the input shaft 20 and the output shaft 22 is commonly referred to as the transmission main shaft. In at least one embodiment, the output shaft 22 includes a yoke 24 coupled to a differential or a drive member.

The transmission 10 may include a first gear set 30, a second gear set 32, and a transmission gear synchronizer 34. The first gear set 30, the second gear set 32, and the transmission gear synchronizer 34 each rotatably disposed within a transmission housing 36.

The first gear set 30 may include a first plurality of gears 40 disposed concentrically about a first transmission shaft 42 such that the first gear set 30 is supported by the first transmission shaft 42. The first gear set 30 may be journaled on the first transmission shaft 42. In at least one embodiment, the first plurality of gears 40 may include a first gear 44 spaced apart from a second gear 46. The first gear 44 and the second gear 46 may be disposed substantially perpendicular to a longitudinal axis 48 of the first transmission shaft 42. The second gear set 32 may include a second plurality of gears 50 disposed concentrically about a second transmission shaft 36 such that the second gear set 32 is supported by the second transmission shaft 36. The second transmission shaft 36 may commonly be referred to as a countershaft.

The first transmission shaft 42 may be spaced apart from and disposed substantially parallel to the second transmission shaft 36. In at least one embodiment, the second plurality of gears 50 may include a third gear 54 spaced apart from a fourth gear 56. The third gear 54 and the fourth gear 56 may be disposed substantially perpendicular to a longitudinal axis 58 of the second transmission shaft 52. The second gear set 32 may be journaled on the second transmission shaft 36.

The first gear set 30 may be rotatably aligned with the second gear set 32. The first plurality of gears 40 of the first gear set 30 engage a corresponding gear of the second plurality gears 50 of the second gear set 32 such that the second gear set 32 are in meshed engagement with the first gear set 30. In at least one embodiment, the first gear 44 may remain in constant mesh or engagement with the third gear 54 and/or the second gear 46 may remain in constant mesh or engagement with the fourth gear 56.

The first plurality of gears 40 and the second plurality of gears 50 may be configured to transmit torque from the input shaft 20 to the output shaft 22. The first plurality of gears 40 and the second plurality gears 50 are configured to provide multiple forward and/or reverse gear ratios or torque ratios. An operator of a vehicle incorporating the transmission 10 may selectively engage at least one of the gears of the first plurality of gears 40 of the first gear set 30 and/or at least one of the gears of the second plurality of gears 50 of the second gear set 32. The selective engagement of the gears defines a plurality of torque flow paths through the first gear set 30 and the second gear set 32 to vary an output torque or gear ratio of the transmission 10.

The shift lever 60 may be operatively connected to at least one shift fork 62 by a set of linkages (not shown). The shift fork 62 translates a sliding gear selector, collar, or sliding sleeve 70 between gears of the first plurality of gears 40 and/or gears of the second plurality of gears 50. A sliding sleeve 70 may be rotatably disposed about the first and/or second transmission shaft 42, 52.

The sliding sleeve 70 may translate towards a desired gear responsive to movement of the shift fork 62. The sliding sleeve 70 may be configured to lock onto a freely spinning gear or engagement ring associated with the desired gear to lock the freely spinning gear associated with the desired gear to the transmission shaft such that the transmission shaft 42, 52 spins together with the desired gear. The engagement of the sliding sleeve 70 with the desired gear may result in nibble, notch, or other transmission effects that may negatively affect transmission shift quality if the rotational speed of collar is not substantially similar to the rotational speed of the desired gear. The transmission gear synchronizer 34 may be provided to brake or accelerate the sliding sleeve 70 and/or the desired gear such that the rotational speed of the sliding sleeve 70 and the desired gear are substantially similar to dampen or minimize the effects of notch, nibble, or other undesired transmission shift effects. In at least one embodiment, the transmission gear synchronizer 34 may adjust the rotational speed of at least one of the first transmission shaft 42 and the second transmission shaft 52 and the desired gear.

Figure 2:
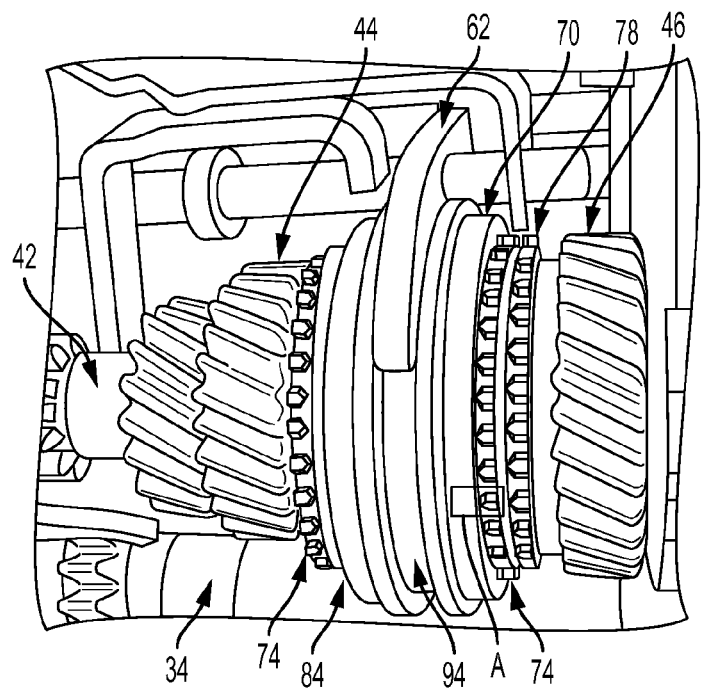
FIG. 2 is a perspective view of an exemplary transmission gear synchronizer with a sliding sleeve assembly in a neutral position.
Figure 3:
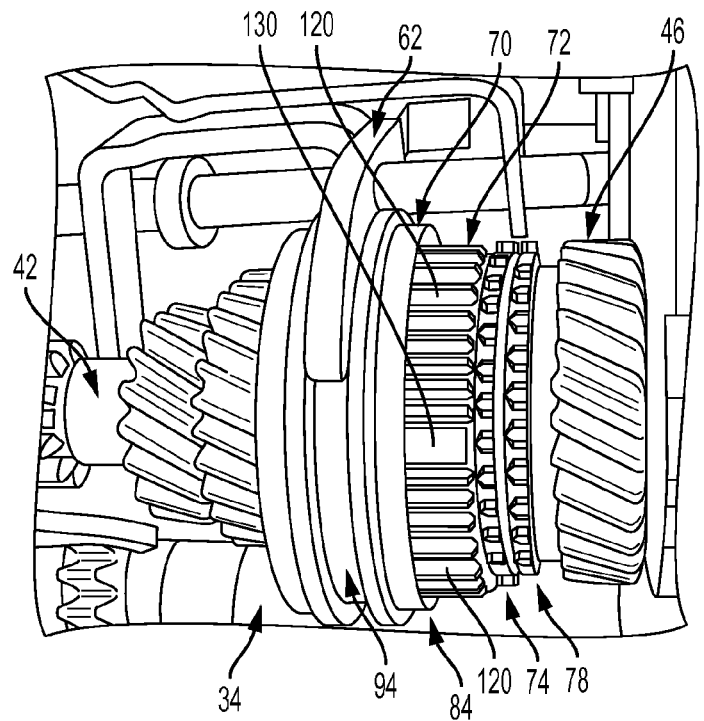
FIG. 3 is a perspective view of an exemplary transmission gear synchronizer with a sliding sleeve in a locked position with a gear.

Referring to FIG. 2, the transmission gear synchronizer 34 is shown with the sliding sleeve 70 in a neutral position between the first gear 44 and the second gear 46. Referring to FIG. 3, the transmission gear synchronizer 34 is shown with the sliding sleeve 70 translated towards the desired gear (e.g. the first gear 44) responsive to actuation by the shift fork 62.

The transmission gear synchronizer 34 may be disposed concentrically about the first transmission shaft 42 such that the transmission gear synchronizer 34 is supported by the first transmission shaft 42. The transmission gear synchronizer 34 may be disposed between or adjacent to the first gear 44 and the second gear 46 of the first plurality of gears 40 of the first gear set 30. In at least one embodiment, the transmission gear synchronizer 34 may be disposed concentrically about the second transmission shaft 52 such that the transmission gear synchronizer 34 is supported by the second transmission shaft 52. The transmission gear synchronizer 34 may be disposed between or adjacent to the third gear 54 and the fourth gear 56 of the second plurality of gears 50 of the second gear set 32.

Figure 4:
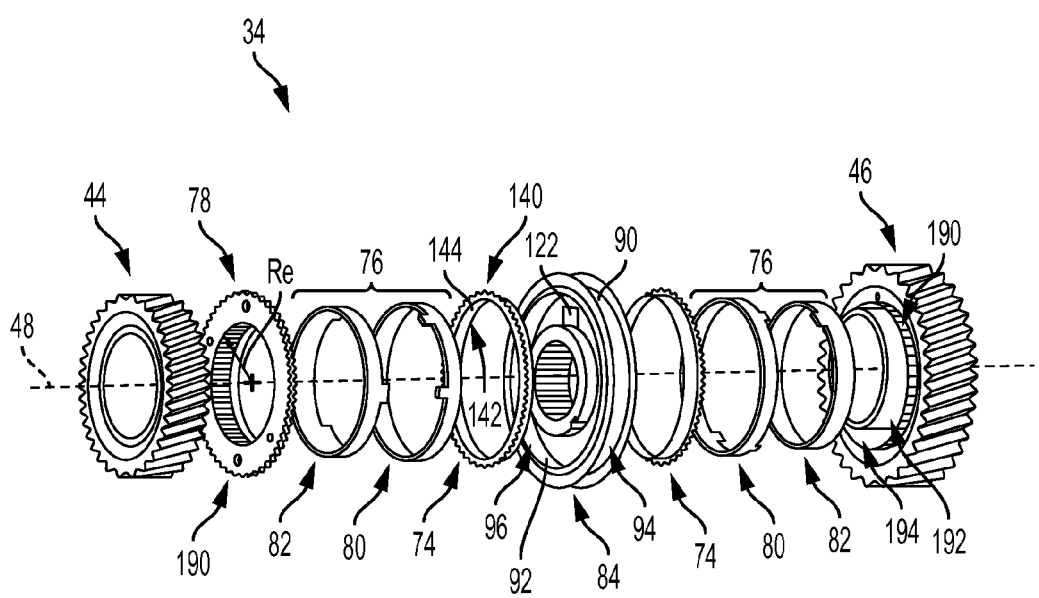
FIG. 4 is an exploded perspective view of an exemplary transmission gear synchronizer.

Referring to FIG. 4, an exploded perspective view of an exemplary transmission gear synchronizer 34 is shown. The transmission gear synchronizer 34 may be a triple cone transmission gear synchronizer however other transmission gear synchronizer configurations are contemplated such as a single cone, dual cone, or other multi-cone transmission gear synchronizers. The transmission gear synchronizer 34 may include a sliding sleeve 70, a fixed hub 72, a synchronization ring or blocker ring 74, an inner synchronizer ring assembly 76, and an engagement ring 78. In at least one embodiment, the transmission gear synchronizer 34 may be a single cone transmission gear synchronizer having the inner synchronization ring assembly 76 excluded. In at least one embodiment, the transmission gear synchronizer 34 may be a dual cone transmission gear synchronizer having at least one of an intermediate synchronization ring 80 or the inner synchronization ring 82 excluded.

Irrespective of the transmission gear synchronizer 34 configuration, the transmission gear synchronization process follows similar steps during a transmission shift event. The transmission shift event may be a transmission upshift event when a transmission gear ratio moves from a lower gear ratio to a higher gear ratio, e.g. N–1, 1-2, 2-3, 3-4, etc. The transmission shift event may be a transmission downshift event when the transmission gear ratio moves from a higher gear ratio to a lower gear ratio, e.g. 4-3, 3-2, 2-1, 1-N, etc. During a transmission shift event, the sliding sleeve 70 is moved by the shift fork 62 towards the desired gear to be engaged. Responsive to a rotational speed difference between the desired gear and the combination of the sliding sleeve 70 and the fixed hub 72, which may be referred to as a sliding sleeve assembly 84, the sliding sleeve 70 is prevented from engaging the engagement ring 78 by the blocker ring 74.

The blocker ring 74 is configured to frictionally engage a cone of the engagement ring 78, the intermediate synchronization ring 80, or the inner synchronization ring 82 associated with the desired gear. The frictional engagement generates a frictional torque to brake or accelerate the rotational speed of the sliding sleeve assembly 84 and/or the engagement ring 78, such that the rotational speeds of the sliding sleeve assembly 84 and the engagement ring 78 or the desired gear are synchronized. Responsive to the synchronization of the rotational speeds, the sliding sleeve 70 may be further translated to engage the engagement ring 78 to complete the transmission shift event.

The sliding sleeve 70 may be configured as a generally cylindrical body disposed concentrically about an axis of the first transmission shaft 42. The sliding sleeve 70 may have an outer surface 90 and an inner surface 92. The outer surface 90 may define an engagement groove 94 that may receive at least a portion of the shift fork 62. The movement of the shift fork 62 within the engagement groove 94 may translate the sliding sleeve 70 away from the neutral position or from a current gear towards the desired gear.

The sliding sleeve 70 may be configured as an internal gear having a sleeve spline disposed about the inner surface 92. The sleeve spline may be configured as a plurality of sleeve teeth 96 that extend radially inward from the inner surface 92 of the sliding sleeve 70 towards the first transmission shaft 42.

Each sleeve tooth 100 of the plurality of sleeve teeth 96 has a tip 102. The tip 102 may be angled with respect to the longitudinal axis 48 of the first transmission shaft 42. The tip 102 may be defined by a first surface 104 and a second surface 106. The first surface 104 may be disposed at a first angle relative to the longitudinal axis 48 of the first transmission shaft 42. The second surface 106 may be disposed at a second angle relative to the longitudinal axis 48 of the first transmission shaft 42. The first surface 104 and the second surface 106 may define an angle θ.

Figure 5A:
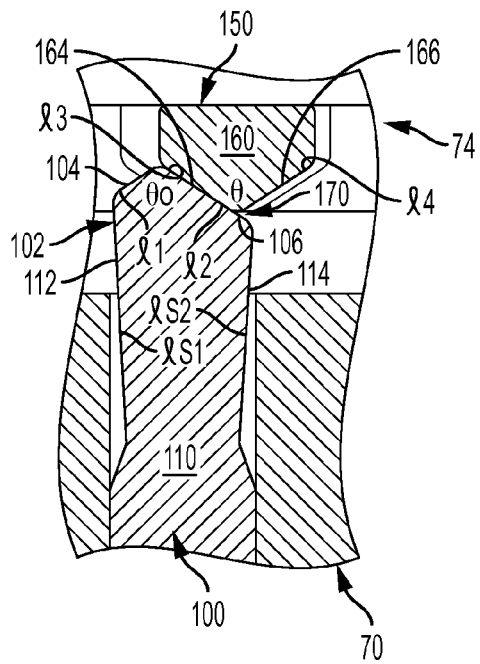
FIGS. 5A, 5B, are partial sectional views of a sliding sleeve assembly in an engaged position with a blocker ring clutch tooth.
Figure 5B:
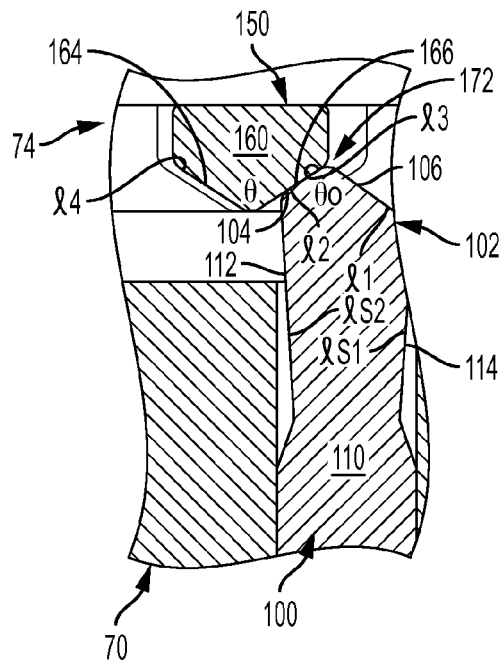
Figure 6:
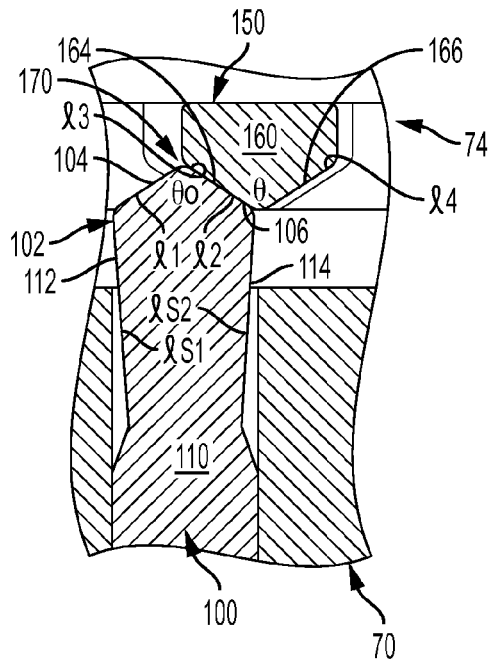
FIG. 6 is a partial sectional view of a sliding sleeve assembly in an engaged position with a blocker ring clutch tooth.
Figure 7:
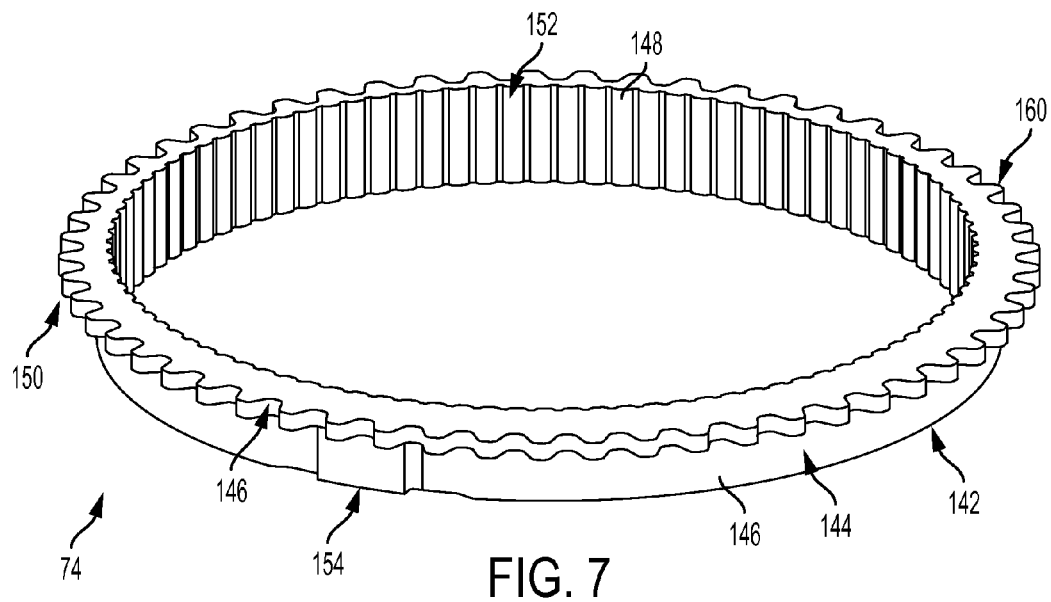
FIG. 7 is a perspective view of an exemplary thermoplastic blocker ring.
Figure 8:
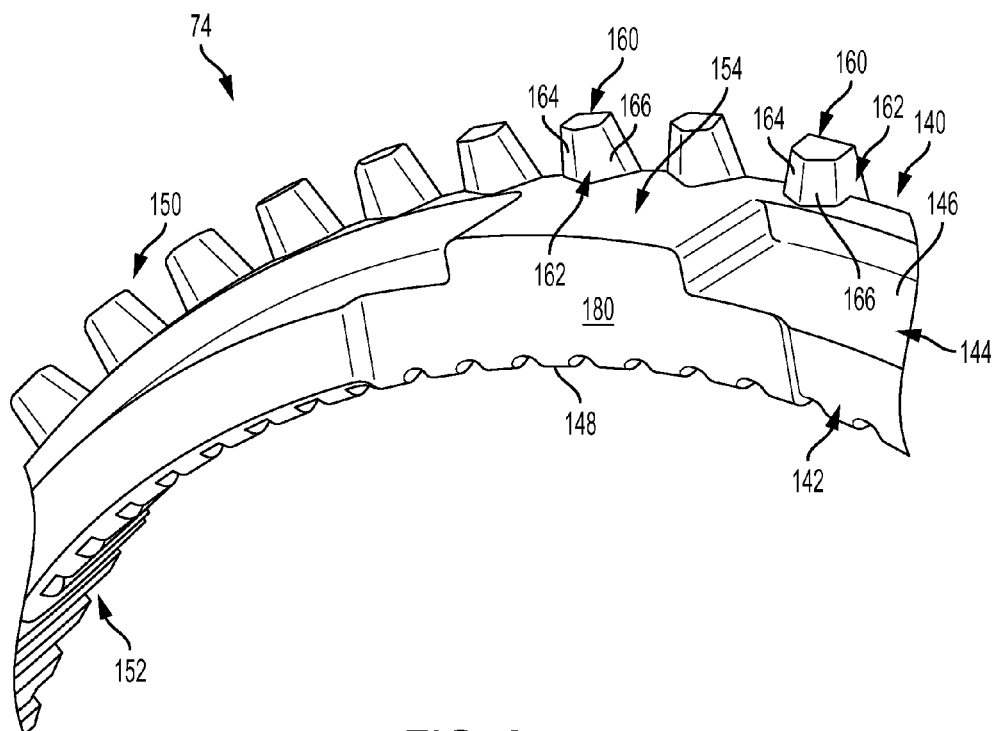
FIG. 8 is a partial perspective view of an exemplary thermoplastic blocker ring.
Figure 9:
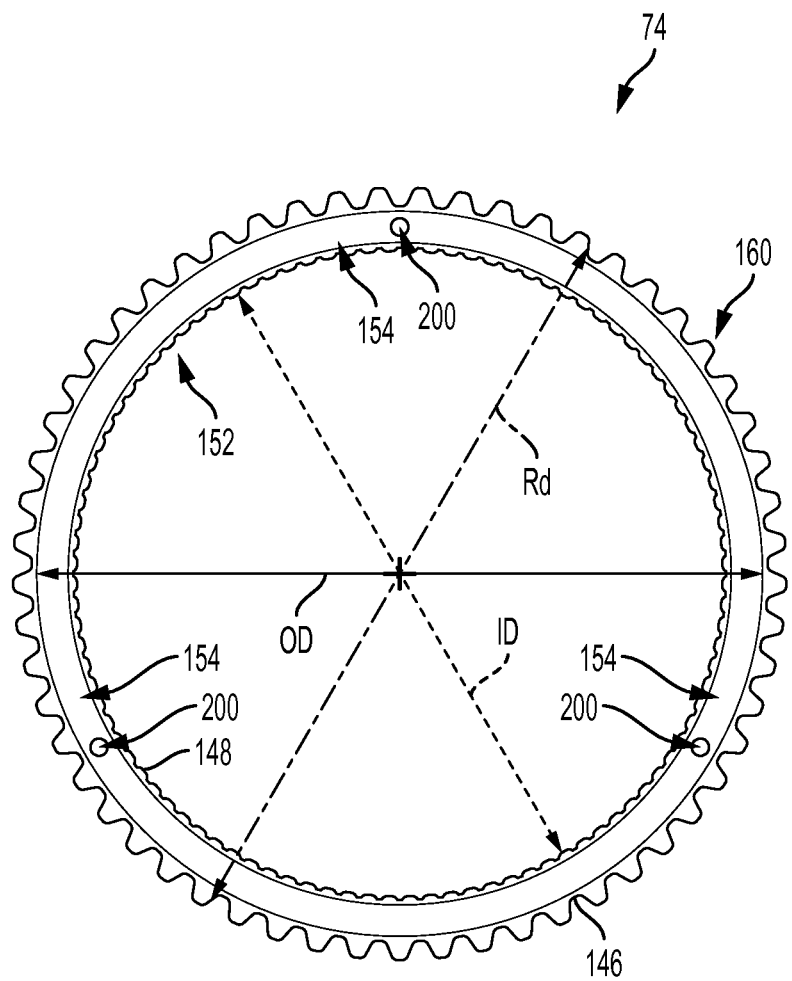
FIG. 9 is a perspective view of an exemplary thermoplastic blocker ring.

Referring to FIGS. 5A, 5B, and 6, a partial sectional view of a sleeve tooth 100 of the sliding sleeve 70 in an engaged position with the blocker ring 74. In at least one embodiment, the first surface 104 and the second surface 104 may be disposed at an obtuse angle $\theta_O$ with respect to each other.

Referring to FIG. 6, in at least one embodiment, the first surface 104 and the second surface 106 may be disposed at an acute angle, $\theta_A$, with respect to each other.

The first surface 104 may have a first length, $l_1$. The second surface 106 may have a second length, $l_2$. As shown in FIGS. 5A and 5B, the second length, $l_2$, may be greater than the first length, $l_1$, such that the first surface 104 and the second surface 106 are asymmetric. As shown in FIG. 6, the first length, $l_1$, and the second length, $l_2$, may be substantially similar to each other, such that the first surface 104 and the second surface 106 are symmetric.

The sleeve tooth 100 may have a body portion 110. The body portion 110 may have a first side surface 112 extending from the inner surface 92 of the sliding sleeve 70 to the first surface 104. The body portion 110 may have a second side surface 114 extending from the inner surface 92 of the sliding sleeve 70 to the second surface 106. The first side surface 112 may be disposed at a third angle relative to the longitudinal axis 48 of the first transmission shaft 42. The second side surface 114 may be disposed at a fourth angle relative to the longitudinal axis 48 of the first transmission shaft 42. The first side surface 112 and the second side surface 114 may be spaced apart from each other and disposed in a non-parallel relationship. The first side surface 112 and the second side surface 114 may become progressively farther apart from one another along an axial direction along the sleeve tooth 100 towards the tip 102.

The first side surface 112 may have a length, $ls_1$. The second side surface 114 may have a length, $ls_2$. The length, $ls_1$, and the length, $ls_2$, may be substantially similar. The length, $ls_1$, and the length, $ls_2$, may be greater than the first length, $l_1$, and the second length, $l_2$, respectively.

The fixed hub 72 is configured to be slidably received within the sliding sleeve 70 which may define the sliding sleeve assembly 84. The first transmission shaft 42 may include a plurality of splined teeth disposed about an outer surface of the first transmission shaft 42. The fixed hub 72 may engage at least one of the plurality of splined teeth of the first transmission shaft 42 via splined teeth disposed about an inner diameter of the fixed hub 72.

The fixed hub 72 may have a plurality of gear teeth 120. The plurality of gear teeth 120 extend radially outward from a root diameter of the fixed hub 72. The plurality of gear teeth 120 may be configured to engage or mesh with the sleeve spline or plurality of sleeve teeth 96. The fixed hub 72 may define a notch 122 disposed proximate the root diameter of the fixed hub 72 and spaced apart from the plurality of gear teeth 120.

The fixed hub 72 may include at least one pre-energizer 130. The pre-energizer 130 may be configured to engage at least one sleeve tooth 100 of the plurality of sleeve teeth 96. The pre-energizer 130 may include a roller, a strut, or a spring disposed about a plunger. The pre-energizer 130 may be received within a cavity extending radially inward from the root diameter of the fixed hub 72. The pre-energizer 130 may be retained within the cavity by the internal diameter of the sliding sleeve 70 or the plurality of sleeve teeth 96.

Responsive to movement of the gear selector fork 62, the sliding sleeve 70 may be moved towards the desired gear, for example the first gear 44 or the second gear 46. The pre-energizer 130 assists in translating the sliding sleeve 70 towards the desired gear during gear synchronization and engagement.

The blocker ring 74 may be disposed proximate the fixed hub 72. The blocker ring 74 may have a first end region 140 disposed proximate the engagement ring 78. The blocker ring 74 may have a second end 142 spaced apart from the first end region 140 and a generally cylindrical body 144 extending therebetween. The generally cylindrical body 144 may have an outer surface 146 and an inner surface 148. The generally cylindrical body 144 may be disposed concentrically about the axis 48 of the first transmission shaft 42.

The blocker ring 74 may be disposed between the desired gear, the engagement ring 78, and the sliding sleeve assembly 84. In at least one embodiment, a second blocker ring may be spaced apart from the blocker ring 74. The second blocker ring may be disposed on another side of the fixed hub 72 between another desired gear and another engagement ring.

The blocker ring 74 is urged towards the desired gear responsive to movement of the gear selector fork 62 and the sliding sleeve 70 towards the desired gear. As the blocker ring 74 is urged towards the desired gear, the blocker ring 74 may engage a cone of the engagement ring 78 associated with the desired gear. The engagement of the blocker ring 74 with the cone of the engagement ring 78 associated with the desired gear may generate friction resulting in rotation of the blocker ring 74. The frictional engagement of the blocker ring 74 with the cone may brake or accelerate at least one of the sliding sleeve assembly 84 and the engagement ring 78 to approximately match the rotational speed of the desired gear to complete the transmission shift event.

The main function of the blocker ring 74 is intrinsically related to its frictional properties because the blocker ring 74 serves as a frictional member to accelerate or brake various components of the transmission 10 involved in the transmission shift event. The blocker ring 74 and the cone of the engagement ring 78 may act as a frictional clutch when they are engaged. Commonly blocker rings are made out of brass, aluminum, or other ferrous alloys. Various surfaces of the metallic blocker ring may be lined or coated with friction materials such as special papers, fibers, brass, or molybdenum to improve the frictional properties of the metallic blocker ring.

Metallic blocker rings may be manufactured by employing extensive machining, coating, and heat treatment processes to obtain the desired frictional properties. Some thermoplastic materials may have both mechanical and frictional properties suitable for blocker rings, to enable the use of the thermoplastic material instead of a ferrous alloy and without a separate frictional lining or coating. As such, the blocker ring 74 may be produced by an injection molding process with minimal machining.

The blocker ring 74 comprising a thermoplastic material lighter in weight than a metallic blocker ring. The blocker ring 74 comprising a thermoplastic material may have comparable strength, stiffness, and endurance as a metallic blocker ring. The blocker ring 74 comprising a thermoplastic material may have additional teeth disposed about the periphery that may improve shift quality and wear life as compared to a metallic blocker ring.

The thermoplastic material may be a high-performance polymer composite. The high-performance polymer composite may have a tensile strength within a range defined by 200-500 MPa. The high-performance polymer composite may have 20%-40% carbon fill, such as a PEEK grade high-performance polymer composite with carbon fill. The carbon fibers used for the carbon fill may have a length of 1 mm to 10 mm and diameter of 0.05 mm to 1 mm.

In at least one embodiment, the high-performance polymer composite may include glass or aramid fibers, or powdered ceramic fillers from 0-20% in weight. These fillers may improve the mechanical properties and the coefficient of friction of the blocker ring 74. Exemplary material properties of high-performance polymers composites compared to brass are shown in Table 1. Table 1 may define ranges of the material properties for the blocker ring 74.

TABLE 1

| Various material properties of high-performance polymers composites. | | | | |
|---|---|---|---|---|
| Property | Units | 40% HPCF | 30% CF | Brass |
| Tensile Strength (23° C.) | MPa | 350 | 260 | 400 |
| Tensile Modulus | GPa | 45 | 25 | 107 |
| Fatigue Life (120° C.) 107 Cycles | MPa | 170 | 120 | 190 |
| Density | g/cm³ | 1.44 | 1.40 | 7.90 |

The 40% HPCF may be a thermoplastic having a composition including 40% high performance carbon fiber fill. For example, the high performance carbon fiber may have a length of 3 mm and a diameter of 0.4 mm. The 30% CF may be a thermoplastic having a composition including 30% carbon fiber fill. For example, the high performance carbon fiber may have a length of 1 mm and a diameter of 0.1 mm.

The blocker ring 74 formed of the thermoplastic material may have a first end region 140, a second end region 142, and a cylindrical body 144 extending between the first end region 140 and the second end region 142. The first end region 140 may be disposed proximate the engagement ring 78. The second end region 142 may be disposed proximate the sleeve assembly 84.

The first end region 140 may be provided with a plurality of molded clutch teeth 150. The second end region 142 may be provided with a molded spline or plurality of molded grooves 152. The cylindrical body 144 may be provided with a molded engagement pad 154.

The plurality of molded clutch teeth 150 may be disposed continuously about a circumference of the first region 140. The plurality of molded clutch teeth 150 may extend radially outward from a root diameter, Rd, of the blocker ring 74.

Each molded clutch tooth 160 of the plurality of molded clutch teeth 150 have an angled end surface 162. The angled end surface 162 may be angled towards the first end region 140 and angled away from the second end region 142. The angled end surface 162 may be defined by a third surface 164 and a fourth surface 166. The third surface 164 and the fourth surface 166 may be angled towards the first end region 140 and inclined with respect to the second end region 142. The third surface 164 may be disposed at an angle relative to the longitudinal axis 48 of the first transmission shaft 42. The fourth surface 166 may be disposed at an angle relative to the longitudinal axis 48 of the first transmission shaft 42. The third surface 164 and the fourth surface 164 may define an angle, θ. Referring to FIGS. 5-6, the third surface 164 and the fourth surface 166 may be disposed at an acute angle, with respect to each other.

The third surface 164 may have a third length, $l_3$. The fourth surface 166 may have a fourth length, $l_1$. The third length, $l_3$, and the fourth length, $l_1$, may be substantially similar to each other, such that the third surface 164 and the fourth surface 166 are symmetric.

The plurality of molded clutch teeth 150 may be configured to engage the plurality of sleeve teeth 96 during a transmission shift event. As shown in FIG. 5A, during a transmission upshift event the third surface 164 of the molded clutch tooth 160 engages the second surface 106 of the sleeve tooth 100. The engagement between the third surface 164 and the second surface 106 defines a first contact area 170. As shown in FIG. 5B, during a transmission down shift event the fourth surface 166 of an adjacent molded clutch tooth engages the first surface 104 of the sleeve tooth 100. The engagement between the fourth surface 166 and the first surface 104 defines a second contact area 172. The asymmetric design of the first surface 104 and the second surface 106 may enable the first contact area 170 to be a larger than the second contact area 172.

As shown in FIG. 6, during a transmission upshift event and a transmission downshift event, the symmetric design of the first surface 104 and the second surface 106 may enable the first contact area 170 to be substantially similar to the second contact area 172. The symmetric design of the first surface 104 and the second surface 106 and the symmetric design of the third surface 164 and the fourth surface 166 may improve the wear life of the molded clutch tooth 160.

The inner surface 148 of the generally cylindrical body 144 may have a plurality of molded grooves 152 defined by the inner surface 148. Each molded groove of the plurality of molded grooves 152 may extend in an axial direction along the inner surface 148 of the cylindrical body 144. Each molded groove may be disposed substantially parallel to the axis 48 of the first transmission shaft 42.

The plurality of molded grooves 152 may be configured as a friction surface. Responsive to the sliding sleeve 70 translating the blocker ring 74 towards a cone of the engagement ring 78 during a transmission event, the plurality of molded grooves 152 engages the cone of the engagement ring 78 responsive to a difference in rotational speed between the desired gear and the sleeve assembly 84. The plurality of molded grooves 152 engaging the cone of the engagement ring 78 in conjunction with the plurality of molded clutch teeth 150 engaging the plurality of sleeve teeth 96 enables the blocker ring 74 to synchronize the rotational speeds of the desired gear and the sleeve assembly 84.

The outer surface 146 may have a molded engagement pad 154 extending radially outwardly from the outer surface 146 of the cylindrical body 144. The molded engagement pad 154 may be spaced apart from the first end region 140. The molded engagement pad 154 may be disposed proximate the second end region 142. In at least one embodiment, the outer diameter of the outer surface 146 may be less than the root diameter, Rd, of the first end region 140, such that the first end region 140 and the cylindrical body 144 are stepped with respect to each other.

The molded engagement pad 154 may be configured to nest within or mate with the notch 122 of the fixed hub 72 of the sliding sleeve assembly 84. The molded engagement pad 154 proximately aligns the plurality of molded clutch teeth 150 relative to the plurality of sleeve teeth 98 of the sleeve spline 96. The molded engagement pad 154 nested within the notch 122 permits relative movement between the blocker ring 74 and the sliding sleeve assembly 84, including the sliding sleeve 70 and the fixed hub 72. Additionally, the second end 142 of the cylindrical body 144 may define a recess 180. The recess 180 may be disposed proximate the molded engagement pad 154 and configured as an indexing slot. The indexing slot clocks the blocker ring 74 relative to the sliding sleeve assembly 84.

The blocker ring 74 may be formed by a process comprising injection molding. The blocker ring 74 may be formed as a unitary body including the molded features such as the molded clutch teeth 150, the plurality of molded grooves 152, the molded engagement pad 154, and the recess 180. The injection molding process may inject the thermoplastic material into a mold cavity through at least three injection gates 200.

At least one injection gate 200 may be located proximate the molded engagement pad 154. In at least one injection molding process, the injection gates 200 may be equally spaced apart such that the resulting molded engagement pad 154 are equally spaced apart at 120° intervals. The equal spacing of the injection gates 200 and the resulting molded engagement pads 154 may improve the mechanical properties of the blocker ring 74 such as stiffness, strength, etc. and minimize geometric distortions.

The engagement ring 78 may be disposed between the desired gear and the blocker ring 74. The engagement ring 78 has a plurality of gear teeth 190 extending radially outward from a root diameter, Re, of the engagement ring 78. The plurality of sleeve teeth 96 may be configured to engage the plurality of gear teeth 190 during a transmission shift event subsequent to or simultaneously with the rotational speed of the desired gear and the sliding sleeve assembly 84 being approximately synchronized.

The engagement ring 78 may have a cone 192 extending axially away from a surface 194 of the engagement ring 78. The cone 192 of the engagement ring 78 may extend, tapering towards the fixed hub 72 of the sliding sleeve assembly 84. The frictional engagement between the plurality of molded grooves 152 and the cone 192 of the engagement ring 78 defines a cone clutch.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A transmission comprising:
a first gear set supported by a first shaft; a second gear set in meshed engagement with the first gear set, the second gear set supported by a second shaft, wherein the first gear set and the second gear set are rotatably disposed within a transmission housing; and
a transmission gear synchronizer supported by the first shaft and disposed adjacent to a gear of the first gear set, the transmission gear synchronizer including:
a sliding sleeve having an inner surface defining a sleeve spline,
a hub received within the sliding sleeve, the hub having a plurality of gear teeth extending radially outward from a root diameter of the hub, the plurality of gear teeth configured to engage the sleeve spline, and a notch disposed proximate the root diameter of the hub and spaced apart from the plurality of gear teeth, and
a blocker ring comprising a thermoplastic material, the blocker ring having a plurality of molded clutch teeth extending radially outward from a root diameter of the blocker ring, and an inner surface defining a molded spline, the plurality of molded clutch teeth are configured to engage the sleeve spline in response to the sliding sleeve engaging the blocker ring during a transmission shift event.

2. The transmission of claim 1 wherein the blocker ring has an outer surface defining a molded engagement pad extending radially outward from the outer surface of the blocker ring, the molded engagement pad configured to nest within the notch of the hub.

3. The transmission of claim 2 wherein the notch is configured to substantially align the molded clutch teeth relative to the sleeve spline and permit relative movement between the blocker ring, the hub, and the sliding sleeve when the molded engagement pad is nested within the notch of the hub.

4. The transmission of claim 1 wherein the gear synchronizer further includes an engagement ring having a cone extending from a surface of the engagement ring towards the hub and gear teeth extending radially outward from a root diameter of the engagement ring, wherein the molded spline of the blocker ring is configured to engage the cone during a transmission shift event.

5. The transmission of claim 1 wherein the thermoplastic material comprises a high-performance polymer composite.

6. The transmission of claim 1 wherein the thermoplastic material has a tensile strength within a range defined by 200-500 MPa.

7. The transmission of claim 1 wherein the thermoplastic material has a density within a range defined by 1.40 to 1.44 g/cm.sup.3.

8. The transmission of claim 1 wherein the sleeve spline further includes:
a plurality of sleeve teeth extending radially inward from the inner surface of the sliding sleeve towards a first transmission shaft, each sleeve tooth of the plurality of sleeve teeth having a tip, the tip defined by a first surface disposed at a first angle relative to a longitudinal axis of the first transmission shaft and a second surface disposed at a second angle relative to the longitudinal axis of the first transmission shaft.

9. The transmission of claim 8 wherein each molded clutch tooth of the plurality of molded clutch teeth has an end surface defined by a third surface disposed at a third angle relative to the longitudinal axis of the transmission shaft and a fourth surface disposed at a fourth angle relative to the longitudinal axis of the transmission shaft, the second surface is configured to engage the third surface during a transmission upshift event and the first surface is configured to engage the fourth surface of an adjacent molded clutch tooth of the blocker ring during a transmission downshift event.

10. The transmission of claim 9 wherein the inner surface of the blocker ring further defines a plurality of molded grooves extending axially along the inner surface of the blocker ring, wherein each molded groove of the plurality of molded grooves is disposed substantially parallel to a longitudinal axis of the blocker ring.

11. The transmission of claim 8 wherein the first surface has a first length and the second surface has a second length, the second length greater than the first length.

12. The transmission of claim 9 wherein the third surface has a third length and the fourth surface has a fourth length, the third length substantially similar to a second length of the second surface.

13. The transmission of claim 8 wherein each sleeve tooth of the plurality of sleeve teeth has a first side surface extending from the inner surface to the first surface and a second side surface spaced apart from the first side surface, the second side surface extending from the inner surface to the second surface, the first side surface and the second side surface being progressively farther apart from one another along the sleeve tooth towards the tip.

14. The transmission of claim 8 wherein the first surface and the second surface are disposed at an acute angle with respect to each other.

15. The transmission of claim 8 wherein the first surface and the second surface are disposed at an obtuse angle with respect to each other.

16. The transmission of claim 9 wherein the engagement of the second surface with the third surface defines a first contact area and the engagement of the first surface with the fourth surface of the adjacent molded clutch tooth of the blocker ring defines a second contact area, the first contact area substantially similar to the second contact area.

\* \* \* \* \*